Arnold v. Bishop.
Forming Bats.
No. 440
Reissued. Mar. 17. 1857.
5572X
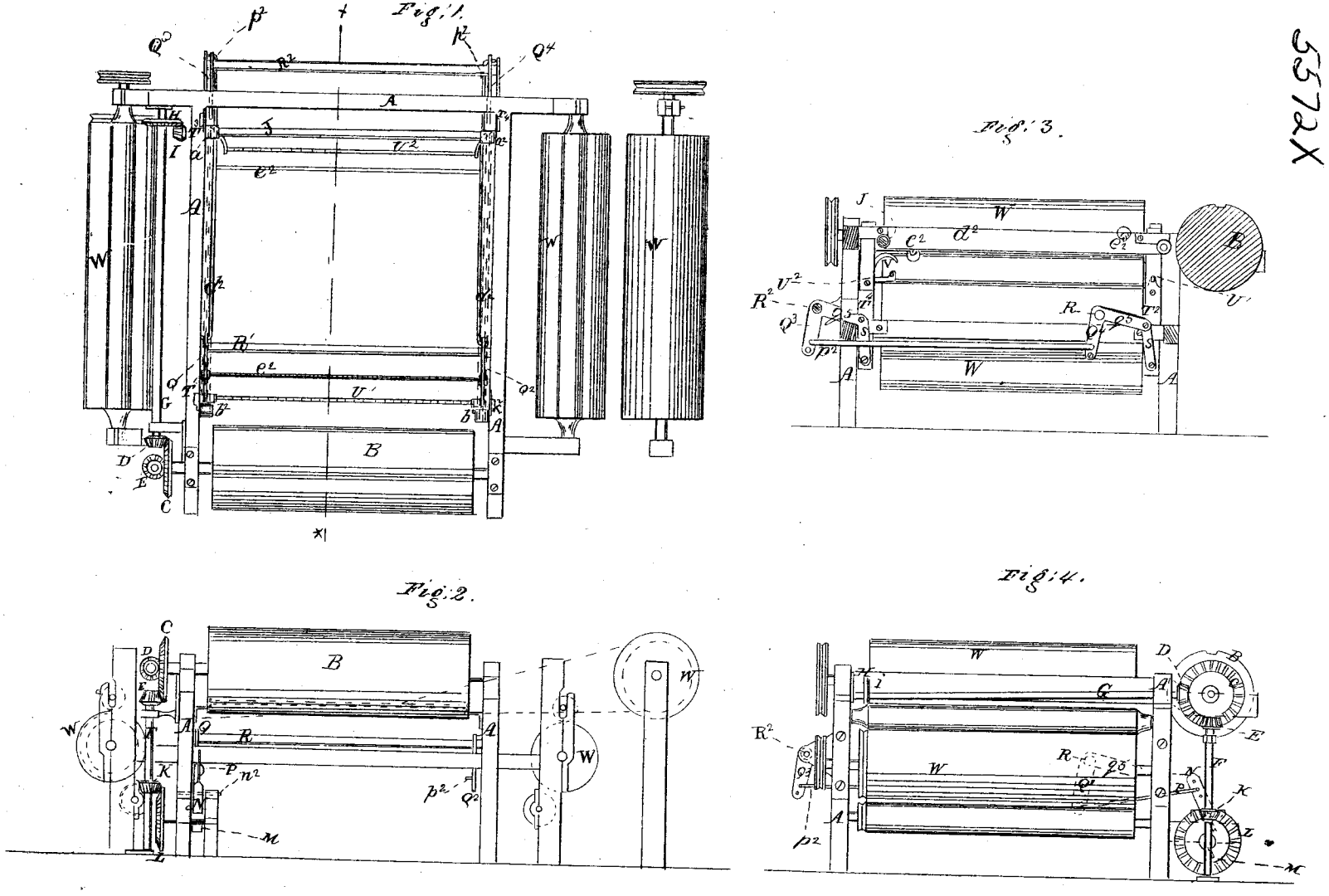

5572 X

UNITED STATES PATENT OFFICE.

UNION MANUFACTURING COMPANY, OF NORWALK, CONN., ASSIGNEES OF CHARLOTTE ARNOLD AND PETER U. MORGAN, (ADMINISTRATORS OF JOHN ARNOLD,) AND GEORGE G. BISHOP, OF SAME PLACE.

IMPROVEMENT IN MACHINES FOR FORMING THE WEB FOR CLOTH, OF WOOL, HAIR, OR OTHER SUITABLE SUBSTANCE, WITHOUT SPINNING OR WEAVING.

Specification forming part of Letters Patent dated October 20, 1836; extended seven years; extended, by act of Congress, for fourteen years from March 28, 1854; Reissue No. 440, dated March 17, 1857.

*To all whom it may concern:*

Be it known that JOHN ARNOLD and GEORGE G. BISHOP, both of Norwalk, in the county of Fairfield and State of Connecticut, and both native-born citizens of the United States, did invent a new and useful improvement on the machine previously invented and patented by the said JOHN ARNOLD for forming the web of cloth, of wool, hair, or other suitable substance, without spinning or weaving, patented July 15, 1829.

In the said machine previously patented by John Arnold, the web of fibers was formed from two cards at right angles, one delivering a continuous sliver or web called the "warp," which was carried continuously through the machine, and the other delivered a series of slivers or webs called the "weft," of carded fibers at right angles, which weft-slivers were laid across the warp-sliver, and in succession, one after another, placed edge to edge, thus forming a double sliver with the fibers of the weft crossing the fibers of the warp, this being repeated to any extent desired to produce a bat of any desired thickness depending upon the required thickness of cloth, to be produced by the after and well-known process of hardening and felting; but although the said invention of the said John Arnold was useful and practical, it nevertheless presented the following defect—viz., wool and hair, and, in fact, all fibers which possess the felting property, are more or less elastic, and in the before-recited patented invention of John Arnold the slivers of weft fibers when delivered were knocked or thrown down onto the sliver of warp fibers by rods called "fallers," and as the fibers are partially distended in the carding operation, so soon as the slivers were delivered, the fibers being relieved, would contract or spring inward to a greater or less extent and reduce the length of the weft-slivers so delivered, and in consequence leave the web with ragged or uneven edges.

The object of the said joint invention of the said ARNOLD and BISHOP is to avoid this defect; and to this end their said invention of improvement on the said original invention of the said John Arnold consists in substituting for the faller-rods, so previously used, the employment of combs, called "faller-combs," which receive the sliver of weft fibers as each in succession is delivered, and which, by reason of the faller-comb teeth entering the slivers near the ends, have the effect to keep the slivers properly and equally distended, so that when laid on the sliver of warp fibers the edges of the web are left smooth and even. These combs are of the same form as the chain-combs described in said patent of the said John Arnold, and are connected with the same levers which supported the faller-rods by arms attached to each, but their movement is different. The faller-rods rose gradually and fell suddenly upon the weft, but the faller-combs are kept at rest until the moment in which the chain-comb and doffer are ready to deliver the weft, when they are raised and receive the weft-sliver from the chain-comb and doffer and carry it down by an easy motion and deliver it on the warp, clearing themselves by a pin and spring in the same manner as the chain-combs clear themselves, as described in the said patented machine of the said John Arnold.

But to describe the said invention or improvement more particularly, we will refer to the accompanying drawings, making part of this specification, in which—

Figure 1 is a plan view of the machine; Fig. 2, a longitudinal side elevation of the same; Fig. 3, a transverse cut-section of the same through the line *x x*, Fig. 4; and Fig. 4 an end elevation of the machine.

The same letters indicate like parts in all the figures.

Letter A is the frame of the machine. Upon the side of it is a doffer, B, of an ordinary carding-machine, for furnishing weft for the texture, and having secured on its axis at one end a bevel gear-wheel, C, which operates two bevel pinion-wheels, D and E, arranged, respectively, on the ends of the shafts F and G, working vertically and horizontally at right angles to the axis of the wheel C. On the opposite end of the horizontal shaft G is secured a bevel gear-wheel, H, which operates with a bevel gear-wheel, I, at right angles to it, and secured upon the end of the shaft J, extending across the machine parallel with the doffer B, and having upon or near its ends pulleys $a^2$ $a^2$, around which and two corresponding carrying or loose pulleys, $b^2$ $b^2$, secured to the frame just back of the doffer, pass endless bands $d^2$ $d^2$, for supporting or carrying the weft across the machine by means of the carrying-combs $e^2$ $e^2$, attached to the endless bands.

On the lower end of the vertical shaft F is a bevel-wheel, K, which gears with the wheel L at right angles to it, the axis of which is parallel with that of the doffer-axis.

On the axis of wheel L is a tappet, M, (represented by dotted lines in Fig. 4,) which tappet as it rotates works a lever, N, secured by a center pin, $n^2$, to the frame of the machine. The upper end of this lever is attached to rod P, having its opposite end hooked into the pendent arm of the right-angled lever Q′, secured upon a rock-shaft, R′, extending across the frame of the machine and parallel with the doffer, and having secured upon its opposite end a second right-angled lever, $Q^2$.

Letter $R^2$ is a second rock-shaft, arranged in suitable brackets to the frame of the machine opposite to the doffer, and having secured on its ends right-angled levers $Q^3$ and $Q^4$, similar to those on the rock-shaft R′, and connected with them by means of the connecting-rods $p^2$ $p^2$, so that a simultaneous motion will be given to the rock-shaft by the rotation of tappet M through the lever N.

Attached to the horizontal arms $Q^5$ of the right-angled levers Q′, &c., are links S, which are secured to the lower ends of the vertical sliding bars T′ $T^2$ $T^3$ $T^4$, working in suitable slots or slideways in the end rails of the frame. Upon these sliding bars—that is, T′ $T^2$, operated by the rock-shaft R′, and on $T^3$ $T^4$, operated by the rock-shaft $R^2$—are adjusted by their ends combs U′ $U^2$, the object and use of which is to raise, by the action of the tappet M, levers N and Q, so as to receive the weft from the carrying-combs and doffer, and then by its gradual descending motion deliver the same upon the warp in an even and distended manner, so as to make the felt perfectly uniform in texture.

As a means of discharging the weft from the teeth of the carrying-combs $e'$ $e^2$, the said combs are connected with the chains $d^2$ $d^2$ by journals at their ends, and on a line with the toothed edge a small pin or stop, V, is attached to the frame of the machine, and as the combs are carried along by the motion of the chains, and when the lower edge of either comb comes in contact with the pin or stop V, it is made to turn on its axis so that the weft readily falls from the carrying-comb teeth, and is thereby delivered to one of the faller-combs, the carrying-comb being restored to its original position by the tension of a spring, $c^2$.

It is obvious that the object of the faller-combs is to keep the sliver of weft distended until it is properly evenly and uniformly laid on the sliver of warp fibers, which must be done by a gradual motion.

Letter W represents the doffer of the warp-card, and W′ W′ the rollers which carry the apron on which the warp-sliver is delivered.

It will be obvious that other and equivalent modes of application may be substituted for the mode of application adopted by the said ARNOLD and BISHOP, and by them described and represented in the Letters Patent granted to them as aforesaid, and we wish it to be distinctly understood that we do not limit the claim of invention to such mode of application, as it will be obvious from the foregoing that the mode of operation of the said improvement is the keeping the length of weft-slivers properly distended until they are properly in contact throughout their entire length with the sliver of the warp fibers, for then the contact of the two slivers will prevent the shortening or contracting action of the fibers.

What is claimed as the invention of the said JOHN ARNOLD and GEORGE G. BISHOP is—

The mode of operation, substantially as herein described, by means of which the slivers of the weft fibers are kept properly distended until their entire surface is in contact with the surface of the sliver of warp fibers, substantially as described.

In testimony whereof the UNION MANUFACTURING COMPANY, of Norwalk, in the county of Fairfield and State of Connecticut, assignees of GEORGE G. BISHOP and the administrator and administratrix of JOHN ARNOLD, deceased, do hereunto set the seal of our company before two subscribing witnesses.

[L. S.] STILES CURTIS,
*President.*

Witnesses:
J. A. WEED,
EDWD. P. WEED.